Patented Jan. 24, 1950

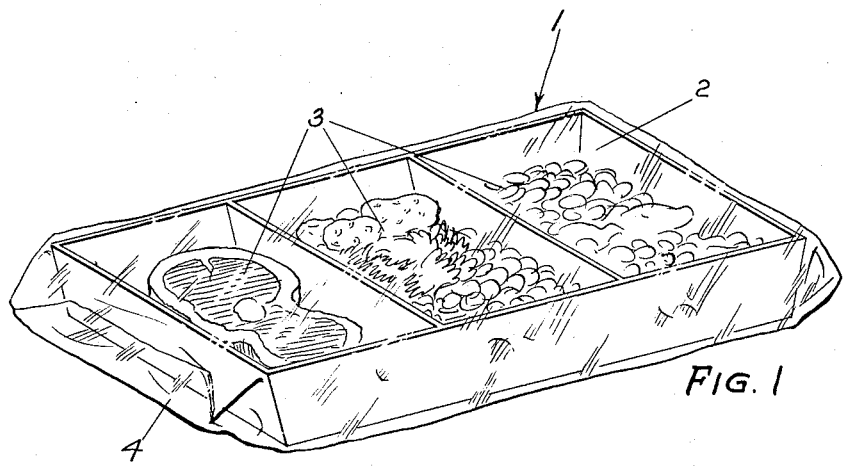
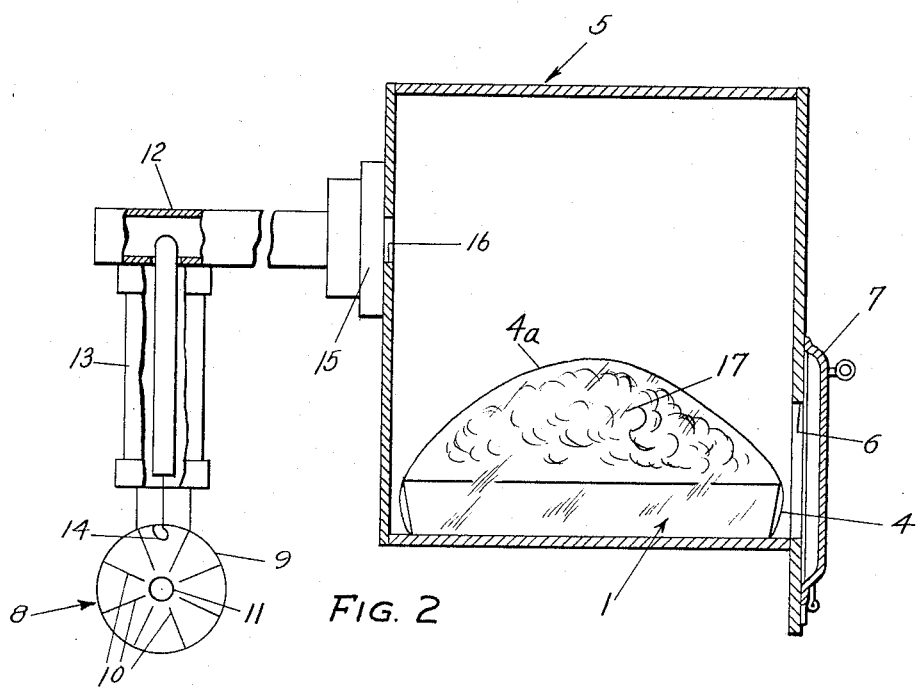

2,495,435

UNITED STATES PATENT OFFICE 2,495,435

METHOD OF TREATING FOODSTUFFS

Arthur E. Welch, Weston, Mass., assignor to Raytheon Manufacturing Company, Newton, Mass., a corporation of Delaware Application January 14, 1947, Serial No. 722,052

4 Claims. (Cl. 99—221)

This invention relates to the treatment of foodstuffs, and more particularly to the cooking thereof through the use of electro-magnetic energy.

One particularly advantageous field of application of my invention is in the heat treatment, before consumption, of precooked frozen foodstuff. However, this invention is not limited to such a field, but is useful in the cooking or heating of other foodstuffs.

Such precooked frozen foods are ordinarily packaged in a moisture-proof wrapper, to eliminate dehydration of the food. In the heating of such frozen foodstuffs by the use of electromagnetic energy, it has been found that the ice crystals normally present in the food have a tendency to reflect the energy, thus preventing proper absorption thereof by the food. I have found that, if the steam produced as a result of heating of the food is retained closely contiguous to the food itself, such steam helps to melt the ice crystals, thereby effectively increasing the absorption of radio-frequency energy by the food.

I have also found that, if the steam is not permitted to escape from the food, food vapors will not escape; consequently the broth of the food and other valuable constituents thereof will not be lost.

I have also found that, if the steam developed is retained contiguous to the food, this will tend to help to produce a more uniform or more even heat pattern in the radio-frequency oven in which the food is being cooked.

An object of this invention, therefore, is to devise a novel method of cooking food by electromagnetic energy, whereby the vapors and steam developed during the cooking are retained in proximity to the food during the cooking process.

Another object is to accomplish the aforesaid object in an inexpensive manner, without the necessity of utilizing special utensils of any kind.

The foregoing and other objects of the invention will be best understood from the following description of an exemplification thereof, reference being had to the accompanying drawing, wherein:

Fig. 1 is a perspective view of a package of foodstuff according to this invention, ready to be heated or cooked; and Fig. 2 is a schematic view showing the package of Fig. 1 during the heating or cooking process.

Referring now more in detail to the drawing illustrating my novel method, and particularly to Fig. 1 thereof, the numeral I generally designates a package of precooked frozen foodstuff which is to be heated or cooked before consumption thereof. Package I includes a receptacle 2, for example of fiber board or other suitable material, which may have partitions therein as shown, said receptacle containing food 3 therein. Receptacle 2 may have an open top as shown, so that it may function as a serving dish.

A wrapper 4 completely encloses receptacle 2, this wrapper being made of a material that has a rather high tensile strength, is somewhat flexible, transparent to electromagnetic energy, and which has a low radio-frequency loss factor. Suitable materials are available as commercial synthetic plastics. One such material, for example, is produced in the form of transparent cellulose sheets, made by regenerating cellulose from a solution, extruding it into a coagulating bath, then moisture-proofing the same by lacquering on both sides. Another such material is a rubber hydrochloride, made in the form of thin transparent sheets. Still another such material is a type of waxed paper which has a high tensile strength.

Wrapper 4 completely encloses receptacle 2, and is sealed therearound by means of a relatively strong, vapor-tight, liquid-tight seal. Said wrapper functions as a moisture-proof envelope, during storage of the frozen food, to prevent or eliminate dehydration thereof, and also functions in a special manner during heating or cooking of the food, as described more in detail below. Wrapper 4 is sealed around receptacle 2 with some degree of looseness, as depicted in Fig. 1.

Now referring to Fig. 2, the package I is shown during the treatment of the foodstuff therein preparatory to the serving thereof. A hollow enclosure or cavity 5 is made of a suitable metal and has rather thin walls as shown; enclosure 5 is adapted to serve as the oven of the cooking apparatus. Oven 5 is adapted to have the food package I placed therein, said package resting on the bottom wall of the oven while the food therein is being cooked. In order to allow access to the interior of the oven for placing the food therein and for removing the food therefrom, an opening 6 is provided in the front wall of the oven 5, this opening being closable by means of a hinged metal door 7. When door 7 is closed, the enclosure 5 is entirely closed except for the opening 16 for the exciting means to be described hereinafter.

Numeral 8 generally designates an electron-discharge device of the magnetron type, which includes, for example, an evacuated envelope 9, made of highly conductive material, such as copper, and provided with a plurality of inwardly-directed, radially-disposed anode vanes 10. The arrangement is such that each pair of adjacent anode vanes 10 forms, together with that portion of the envelope lying therebetween, a cavity resonator whose natural resonant frequency is, as is well known to those skilled in the art, a function of the geometry of the physical elements making up the same. The dimensions of each such cavity resonator are preferably such that the wavelength of the electrical oscillations adapted to be generated therein has a predetermined value which lies in the microwave region of the frequency spectrum.

Centrally located in envelope 9 is a highly electron-emissive cathode member 11, for example of the well known alkaline-earth metal oxide type, said cathode member being provided with conventional means (not shown) for raising the temperature thereof to a level sufficient for thermionic emission.

The electron-discharge device 8 is completed by magnetic means (not shown) for establishing a magnetic field in a direction transversely of the electron path between the cathode and anode members thereof.

Magnetron 8 is energized from any suitable source (not shown) and when so energized delivers hyper-frequency energy to a hollow waveguide 12 through a coaxial transmission line 13 which is coupled to oscillator 8, for example, by a loop 14. The central conductor of line 13 extends into the interior of waveguide 12 near one end thereof, through an opening provided in a side wall of said guide, to serve as an exciting rod or exciting probe for said guide. The outer conductor of line 13 is connected at one end to envelope 9 and at its opposite end to the wall of guide 12.

The end of guide 12 nearest this exciting rod is closed, while the opposite end of said guide is fastened to the rear wall of enclosure 5 by a suitable fastening means 15 and is open. The interior of guide 12 is placed in energy-transmitting relationship with the interior of the cavity 5 by means of an aperture 16 provided in the rear wall of said cavity, this aperture being of the same size and configuration as the interior of guide 12 and being aligned with said guide to place the interior of said guide in communication with the interior of cavity 5. Aperture 16 is preferably located above the horizontal midplane of oven 5.

By means of the above-described structure, high-frequency electromagnetic energy, or microwave energy, is fed by waveguide 12, from magnetron oscillator 8 to the interior of oven or cavity 5. If desired, a "stirrer" (not shown) may be provided in cavity 5 to accomplish a more even distribution of the radio-frequency energy in oven 5, in accordance with the principles disclosed in the copending application of Hall and Gross, Ser. No. 721,540, filed January 11, 1947.

Since wrapper 4 of package 1 is transparent to electromagnetic energy, the foodstuff in package 1 enclosed by wrapper 4 is exposed to the high-frequency electromagnetic energy present in enclosure 5; this energy impinges on said foodstuff and is absorbed thereby, resulting in heating of said foodstuff. When the foodstuff is heated, clouds 17 of steam and food vapor are formed by such foodstuff inside wrapper 4. Since wrapper 4 is sealed around the foodstuff in a vapor-tight manner, and since said wrapper has great strength and preferably some looseness, clouds 17 cause the wrapper to balloon upwardly, as at 4a. I have found that the wrapper 4 is ballooned by the steam pressure within the same, as stated above, but is not broken. This may be due to several causes. One is that, when heating is done with high-frequency electromagnetic energy, the time interval required for heating is so very short (being of the order of one minute, for example) that there is simply insufficient time for the steam pressure to build up sufficiently to break the wrapper. Another is that, with radio-frequency heating and with a wrapper having a low radio-frequency loss factor, heat does not have to be transmitted as such through the wrapper and the wrapper is not heated appreciably by the radio-frequency energy, so that the wrapper remains relatively cool; a cool surface in contact with the steam causes the steam to condense thereon and prevents the building up of an excessively high steam pressure. Another is that the wrapper is made of a rather tough material. In any event, since the wrapper is not broken, the steam and food vapor 17 is retained closely contiguous to the food during the cooking process and is not lost; the steam helps to melt the ice crystals, helps to produce a more uniform radio-frequency heat pattern over the food, and since it is not permitted to escape from the food, the food broth is not lost.

From the above description, it will be seen that I have disclosed a novel cooking method in which electromagnetic energy is used for cooking and in which the steam and food vapors developed during the cooking process are maintained close to the food during the cooking process. Due to the fact that the material of wrapper 4 has a low radio-frequency loss factor, and due to the fact that heat does not have to be transmitted through the wrapper in order to heat the food, said wrapper will not become hot enough to burn during the exposure to the radio-frequency energy. Such a wrapper would not be effective for steam-retaining purposes when exposed to an open flame or when utilized with other types of cooking ovens, since said wrapper would burn in such cases because heat has to be transmitted as such through the wrapper in order to heat the food within the same. However, due to the toughness, flexibility and radio-frequency-energy-transparency of wrapper 4, such a wrapper may be effectively used as a steam-retainer in the cooking method of this invention.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. In the method of treating foodstuffs, those steps which include: enclosing the foodstuffs to be treated in a wrapper transparent to electromagnetic wave energy; and exposing the enclosed foodstuff to electromagnetic wave energy in the microwave range for a period of time sufficient to heat the same to a predetermined degree.

2. In the method of treating foodstuffs, those steps which include: enclosing the foodstuff to be treated in a wrapper transparent to electromagnetic wave energy; sealing said wrapper around said foodstuff in a vapor-tight manner; and exposing the enclosed foodstuff to space radiated electromagnetic wave energy in the microwave range for a period of time sufficient to heat the same to a predetermined degree.

3. In the method of treating foodstuffs, those steps which include: enclosing the foodstuff to be treated in an expansible wrapper transparent to electromagnetic wave energy; and exposing the enclosed foodstuff to electromagnetic wave energy in the microwave range for a period of time sufficient to heat the same to a predetermined degree.

4. In the method of treating foodstuffs, those steps which include: enclosing the foodstuff to be treated in a tough expansible wrapper transparent to electromagnetic wave energy; sealing said wrapper around said foodstuff in a vapor-tight manner; and exposing the enclosed foodstuff to space radiated electromagnetic wave energy in the microwave range for a period of time sufficient to heat the same to a predetermined degree.

ARTHUR E. WELCH.

REFERENCES CITED

The following references are of record in the file of this patent:

UNITED STATES PATENTS

| Number | Name | Date |
| --- | --- | --- |
| 1,181,219 | Goucher | May 2, 1916 |
| 1,863,222 | Hoermann | June 14, 1932 |
| 1,900,573 | McArthur | Mar. 7, 1933 |
| 1,945,867 | Rawls | Feb. 6, 1934 |
| 1,981,583 | Craig | Nov. 20, 1934 |
| 2,052,919 | Brogden | Sept. 1, 1936 |
| 2,122,741 | Haddad | July 5, 1938 |

FOREIGN PATENTS

| Number | Country | Date |
| --- | --- | --- |
| 26,754 | Great Britain | of 1897 |

OTHER REFERENCES

Modern Packaging, vol. 17, Feb. 1944, page 99, "Electric sterilization in the package."